United States Patent
Uysal et al.

(10) Patent No.: US 8,990,270 B2
(45) Date of Patent: Mar. 24, 2015

(54) PROTOCOL VIRTUALIZATION FOR A NETWORK FILE SYSTEM

(75) Inventors: Mustafa Uysal, Palo Alto, CA (US);
Ram Swaminathan, Palo Alto, CA (US); Junwen Lai, Bellevue, WA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2336 days.

(21) Appl. No.: 11/498,344

(22) Filed: Aug. 3, 2006

(65) Prior Publication Data

US 2008/0126434 A1 May 29, 2008

(51) Int. Cl.
*G06F 17/30* (2006.01)
*H04L 29/06* (2006.01)
*H04L 29/08* (2006.01)

(52) U.S. Cl.
CPC ............ *H04L 67/1097* (2013.01); *H04L 69/08* (2013.01); *G06F 17/30233* (2013.01)
USPC .......................................... 707/821; 711/203

(58) Field of Classification Search
USPC .......................................................... 707/10
See application file for complete search history.

(56) References Cited

U.S. PATENT DOCUMENTS

| | | | |
|---|---|---|---|
| 5,737,523 A | 4/1998 | Callaghan et al. | |
| 5,838,910 A | 11/1998 | Domenikos et al. | |
| 5,937,406 A | 8/1999 | Balabine et al. | |
| 6,356,863 B1 * | 3/2002 | Sayle | 703/27 |
| 6,601,070 B2 * | 7/2003 | Zhang et al. | 707/8 |
| 6,907,414 B1 | 6/2005 | Parnell | |
| 6,985,956 B2 | 1/2006 | Luke et al. | |
| 7,200,622 B2 * | 4/2007 | Nakatani et al. | 707/202 |
| 7,552,223 B1 * | 6/2009 | Ackaouy et al. | 709/229 |
| 2003/0110188 A1 * | 6/2003 | Howard et al. | 707/200 |
| 2006/0080370 A1 * | 4/2006 | Torii et al. | 707/204 |
| 2006/0123062 A1 * | 6/2006 | Bobbitt et al. | 707/200 |
| 2007/0038697 A1 * | 2/2007 | Zimran et al. | 709/203 |

* cited by examiner

*Primary Examiner* — Sherief Badawi
*Assistant Examiner* — Sabana S Rahman (57) ABSTRACT

A network file system includes at least one unmodified client and at least one unmodified physical file server (PFS). Each PFS has at least one file that is identified by an associated physical file handle (PFH). The network file system includes virtual file servers (VFSs) in a data path between the client(s) and the PFS(s). The network file system also includes a virtualized name space that is mapped to the PFS(s) and is provided to the client(s) by the VFS(s). The network file system further includes a virtualized ID space that is established in response to a request from a client. Within the ID space, each file is identified by a physical file handle (PFH) on a PFS. The PFH and PFS pair are mapped to provide a virtual file handle (VFH), and the map of the VFHs is allocated among the VFSs.

16 Claims, 7 Drawing Sheets

PROTOCOL VIRTUALIZATION FOR A NETWORK FILE SYSTEM

FIELD OF THE INVENTION

The present invention relates generally to the field of distributed computer systems and more specifically, to systems and methods for file server virtualization.

BACKGROUND

Networked computer systems are becoming increasingly popular as they permit different computers to share information. In many networks, some nodes play a very specific roll, that of file server. The concept of a file is universal in computer science, i.e., a named unit of data storage. Files have been the principle method for communication between programs and computer systems since the 1950's, but not without difficulty.

Typically, the files are organized in a specific fashion as dictated by the file system imposed upon the file server. To access a file, a requesting client must know the access protocols for that specific file system. If the client does not know the correct protocols, the files will be unavailable. For example, a Microsoft Windows™ workstation client understands FAT and NTFS file structures, but not UNIX. Access to UNIX files can be achieved, though it requires an additional application such as for example the open source application SAMBA which is capable of handling the necessary translations for file access.

Over the years, file servers based on standard protocols such as Network File System (NFS) and Common Internet File System (CIFS) have been adopted as the defacto standard for file service. Today, large organizations deploy numerous independent file server appliances to meet the huge increase in their storage demand. Unfortunately, in most situations such deployment is merely a stop-gap solution due to the single-server architecture of these popular protocols. This results in what is commonly termed 'server sprawl'. Server sprawl is far from desirable as it forces organizations to manage independent storage islands at a high cost, limiting their flexibility to use the full capacity of existing storage resources, and creating bottlenecks and load imbalances.

Attempts have been made to harmonize the servers through virtualization schemes with varying degrees of success. The Mirage project from the University of Arizona has demonstrated an ability to enable a union of name spaces from multiple-file servers to present a single name space. However, this union of the name space does not support the migration of objects (files and directories) between multiple file servers.

Slice μ-proxy from Duke University is a request routing proxy implemented as a packet filter. It can implement a virtual NFS server by using a combination of specialized file servers and storage nodes, but cannot use existing NFS servers with modification. In addition, it supports request routing only and cannot support load balancing or dynamic file migration.

Commercial products also attempt to provide solutions, but they too have less than desirable success. Acopia and Rainfinity offer file virtualization switches. Acopia provides data location independence by storing and managing name spaces and metadata at a middle node (between the clients and the file servers) and treating the file servers as object stores. As file servers are designed to handle file transactions, shifting this responsibility to the middle node looses many optimizations that the file servers would otherwise provide. Further, the middle node is prone to bottleneck problems as more clients join the system and demand file access.

Rainfinity uses a hybrid out-of-band global namespace and an in-band switch-based (Layer-2) protocol processing that permits administrator controlled data migrations between the servers. The multiple protocols and administrator limited migration ability yields overhead and system constraints. As with Acopia, bottlenecking is also an issue.

File server caches and cache appliances introduced between clients and servers attempt to help resolve some client requests more quickly then others, but again do not achieve an overall virtualization of the discreet file servers, and bottlenecking can be an issue even with the cached data.

Moreover, attempts to collectively harmonize a plurality of server systems as a virtualized combined file server have a variety of shortcomings, including but not limited to, requiring modification of the server or client system, offloading server actions from the file servers to middle nodes with the sacrifice of file server optimization, achieving some name space unionization but without the ability to support data migration and load balancing, and providing a degree of file access virtualization but through the constraint of a single node subject to bottlenecking.

Hence, there is a need for a protocol virtualization system and method for a network file system that overcomes one or more of the drawbacks identified above.

DETAILED DESCRIPTION

Before proceeding with the detailed description, it is to be appreciated that the present teaching is by way of example only, not by limitation. The concepts herein are not limited to use or application with a specific system or method for a protocol virtualization for a network file system. Thus, although the instrumentalities described herein are for the convenience of explanation, shown and described with respect to exemplary embodiments, it will be appreciated that the principles herein may be applied equally in other types of systems and methods involving protocol virtualization for network file systems.

Figure 1:
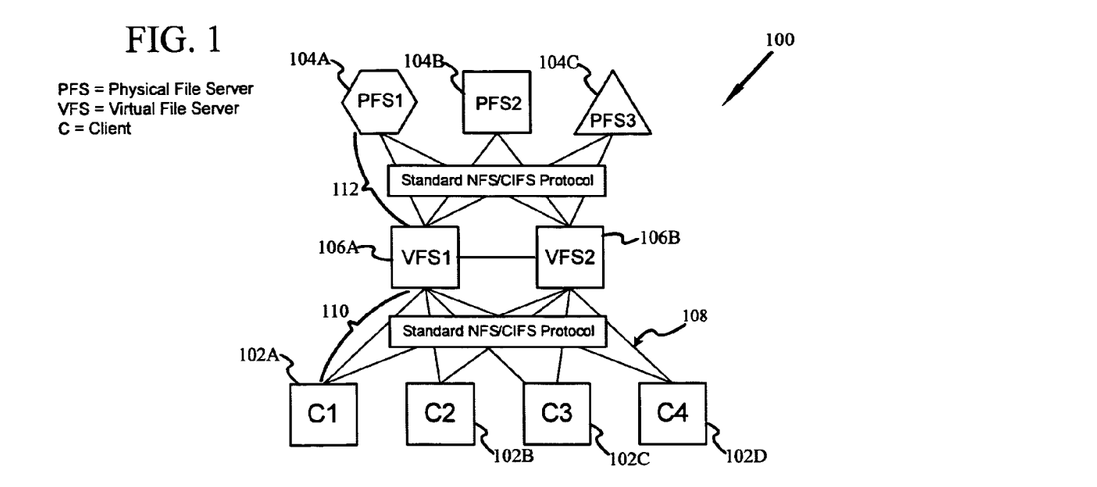
FIG. 1 is a block diagram of a network file system in accordance with an embodiment.

FIG. 1 is a high level block diagram of a network file system 100 in accordance with at least one embodiment. As shown, the network file system 100 generally consist of at least one client 102 (of which 102A~102D are exemplary), at least one physical file server (PFS) 104 (of which 104A~104C are exemplary) and at least one virtual file server (VFS) 106 (of which 106A~106B are exemplary) interconnected by at least one network 108. As shown, VFSs 106A~106B are in the data path between clients 102A~102D and PFSs 104A~104C. As such, the network 108 may actually be considered as two networks, e.g., network 110 as between the clients 102 and VFSs 106, and network 112 as between the PFSs 104 and the VFSs 106. Moreover, network 110 and 112 may be truly separate networks or they may be elements of the same network, e.g., overall network 108.

Each PFS 104 is a machine that exports a set of files. Each client 102 is a machine that accesses such files. With respect to the clients 102 and PFSs 104, it is understood and appreciated that these systems are unmodified (e.g., an unmodified client and physical file server) for use in the network file system 100. More specifically, no special applications, software libraries or devices are installed or otherwise established upon the clients 102 and PFSs 104 in order for them to participate in the network file system 100.

In at least one embodiment, the clients 102 are understood and appreciated to be systems such as might be used by a human operator or by some software system. More specifically, clients 102 are systems which are capable of and intended for use in processing applications as may be desired by a user or by some software system. The clients 102 therefore may be systems that are commercially available as provided by HP or other computer providers.

In at least one embodiment, the VFSs 106 are also understood and appreciated to be typical systems such as systems that are commercially available as provided by HP or other computer providers. In at least one embodiment they may be enhanced with faster memory and network interfaces so as to more quickly process the transactions between the clients 102 and PFSs 104. In yet another embodiment, the VFSs 106 may be customized systems built specifically to act as VFS systems.

The PFSs 104 are also understood and appreciated to be typical systems appropriate for use as file servers. Many such systems are highly optimized for file service, and may already employ file backup and recovery systems and/or devices. As shown in FIG. 1, all communication between the clients 102 and the PFSs 104 is intercepted by the VFSs, specifically either VFS 106A or 106B, which are responsible for rewriting all request/reply packets in transit between the clients 102 and the PFSs 104. From the perspective of each client 102 the VFSs 106 behave like a server and from the perspective of each PFS 104 the VFSs 106 behave like a client. That the clients 102 and PFSs 104 are actually dealing with the VFSs 106 is both unknown and immaterial to the clients 102 and PFSs 104. Moreover, in at least one embodiment the VFSs 106 are transparent to both the clients 102 and PFSs 104. The VFSs 106 are described as transparent because from the perspective of the clients 102 and the PFSs 104 the VFSs 106 are unseen for their true identity and function in the network file system 100.

In at least one embodiment, the PFSs 104 are network file servers operating under NFS. NFS is a common well understood client-server architecture commonly used to provide access to remote files. In alternative embodiments the PFSs 104 may be established with Microsoft's Server Message Block (SMB), or the more current revisions known as the CIFS. Other file systems and their associated protocols may also be used, however NFS, SMB, and CIFS are generally preferred as being well known and operating with typical network transfer protocols such as TCP/IP, UDP/IP and the like.

Each VFS 106 exports one or more virtual volumes to the clients 102. In at least one embodiment this is achieved in a similar fashion to the existing NFS model of exporting file systems. Each virtual volume is composed of a set of dynamic subtrees that are distributed among the various PFSs 104, though the distribution and true location is entirely hidden from the clients 102.

A new subtree can be created on the fly anywhere within any existing subtree and migrated to another PFS. The boundary directories that graft subtrees stored on multiple separate PFSs are called junction directories. Junction directories are unknown constructs in typical network file systems such as for example NFS and CIFS; however, in the network file system 100 they are used by the VFSs 106 to transparently aggregate multiple PFSs 104.

Figure 2:
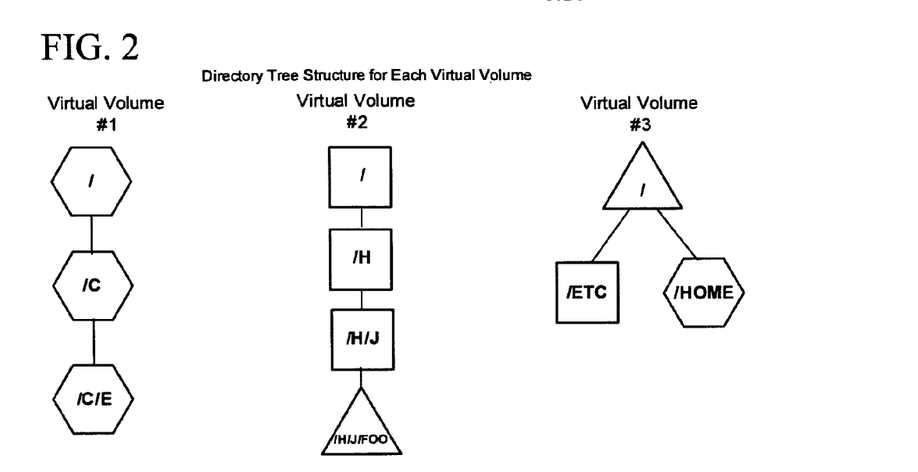
FIG. 2 illustrates virtual volume subtrees in accordance with an embodiment.

Each client 102 can mount a virtual volume from any VFS 106 that exports it, and such mounting is the same as mounting a file system from a standard server. FIG. 2 provides examples of three virtual volumes. As is apparent in FIG. 1 each PFS 104 is shown having a different shape. In FIG. 2 the true location of the file tree element is indicated by the matching shape of the corresponding PFS 104. For ease of discussion and illustration, directories in the accompanying figures are indicated in ALL CAPS, whereas files are indicated in lowercase.

With respect to FIG. 2, Virtual Volume #1, has Root "/", directory C "/C" and directory E "/C/E" all of which are physically located upon PFS 104A. Virtual Volume #2 has Root "/", directory H "/H", directory /J "/H/J" and directory FOO "/H/J/FOO", though as indicated by the two shapes, this virtual volume actually involves files located on PFS 104B and PFS 104C. Virtual Volume #3 has Root "/", directory ETC "/ETC" and directory HOME "/HOME" and as indicated by the three shapes, involves all three PFSs 104A~104C.

Figure 3:
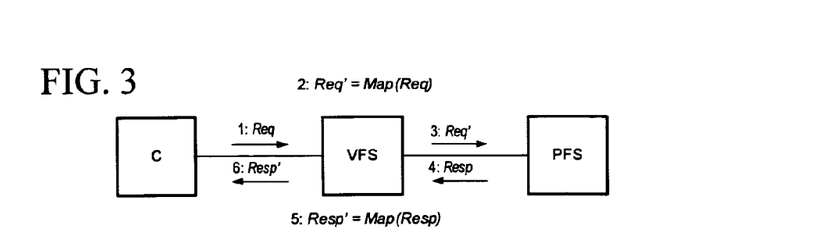
FIG. 3 illustrates the interaction flow and translation operations of the network file system as shown in FIG. 1 in accordance with an embodiment.

Moreover, in the case of Virtual Volume #2, subdirectory /J on PFS 104B is a junction directory linking to directory FOO on PFS 104C. Likewise, in the case of Virtual Volume #3, the root directory is a junction directory linking from PFS 104C to subdirectory ETC on PFS 104B and subdirectory HOME on PFS 104A FIG. 3 illustrates the processing of a typical file system request in network file system 100. First, client 102B sends a request Req to VFS 106A. Req only contains fields that VFS 106A understands, since to client 102B, VFS 106A is the server. Upon receiving Req, VFS 106A parses Req and consults a global protocol dependent translation database collectively maintained by all the VFSs 106 to determine which PFSs 104 need to be involved to process Req and how to translate Req into requests that the involved PFSs 104 will understand. For most requests, only one PFS, such as PFS 104A is involved. VFS 106A then rewrites Req and transforms it into Req' that PFS 104A can understand. In some cases, Req' may be very different from Req and therefore a full packet reassembly may be needed instead of packet rewriting.

Next, VFS 106A sends Req' to PFS 104A. PFS 104A then processes the request, just as it would handle a normal client request and sends the response Resp back to VFS 106A. VFS 106A then parses Resp, translates it to Resp' by consulting the translation database again and then sends Resp' back to client 102B.

The ability to process a request as illustrated in FIG. 3 is achieved by presenting a virtualized name space and virtualized ID space to the clients 102.

Virtualized ID Space

Each PFS 104 manages its own independent ID space, issuing unique file handles for the objects it stores, i.e., files and directories. These file handles as assigned and managed by each PFS are each known as a physical file handle (PFH). Each VFS 106 issues virtual file handles (VFHs) to the clients 102 for objects stored in the virtual volumes corresponding to the PFHs issued by the PFSs 104. As appropriate, the VFSs 106 also replace other ID's issued by the PFSs 104, such as the file system id and file id with virtual counter parts to ensure that no two objects in a virtual volume have the same ID.

Each VFH is mapped to provide a PFH on a specifically identified PFS 104. Further, in at least one embodiment the mapping of each PFS and PFH pair (PFS#:pfh_file_x) to a VFH is unique and/or arbitrary. In at least one alternative embodiment, an optional hash variable is also employed to heighten security. For example, in at least one embodiment, each VFH is generated by: VFH=secure-hash (PFS, PFH, secret).

More specifically, the hash is a measure to protect against clients 102 using the VFSs 106 as gateways to gain access to the PFSs 104 by guessing the PFHs. The secret in the hash is known only to the VFSs. Any of the existing secure hashing schemes such as SHA-1 or SHA-256 can be used to implement the VFH generation. With this scheme, it is computationally expensive for clients to forge a VFH without being detected and it is relatively easy for any VFS 106 to verify the validity of a VFH that is presented to it by a client.

The map between the VFH and PFS:PFH pairs is maintained and shared by the VFSs 106. More specifically, if there is only one VFS 106, clearly it maintains the entire map, however, in embodiments having a plurality of VFSs 106, the map is distributed between them. This mapping not only permits the VFSs 106 to translate the requests from clients 102 to PFS 104, it also permits the VFSs 106 to maintain the relationship with an object when it is moved from one PFS to another, and thus will change the PFH.

As the map, or translation database, is distributed among the VFSs 106 it is kept current and consistent by each VFS aggressively pushing updates to other VFSs and by aggressively caching the entries in the database. Although each VFS 106 stores its own portion of the map, the map may, and more specifically the allocations of the map, may also be stored on one or more PFSs 104 so as to ease recovery in the event a VFS 106 fails.

In at least one embodiment, every mapped entry of the translation database has a forward manager and a backward manager whose identities are determined by hashing the VFH and PFS:PFH pair respectively. The VFS 106 that translates a VFH to a PFS:PFH pair is called the forward manager of the entry, and the VFS that translates the PFS:PFH pair to a VFH is called the backward manager of the entry. When a new entry in the translation database is created, such as in response to a successful CREATE or MKDIR request, the entry is forward to both the forward and backward managers. This way, every new VFH entry exists in the VFS at multiple known locations besides the VFS 106 which created the map entry.

When presented with a VFH, the VFS first consults its local copy of the map and performs the translation if the entry is found (e.g., the translation is performed directly by the VFS receiving the VFH). If the VFS does not have a map entry for the translation, the VFS performs a hash upon the VFH to identify the forward manager (e.g., VFS having the appropriate application of the map) and sends the translation request to the forward manager. In addition to receiving the translation and completing the transaction, in at least one embodiment the VFS will cache the translation for a tunable period of time.

So as to assist in quick communication between VFSs 106, in at least one embodiment a version of the uniform gossip protocol (i.e., Kemp, FOCS 2002) is used between VFSs 106 to aggressively propagate new entries among the VFSs. The use of the uniform gossip protocol insures that an entry in the translation database is propagated to all VFSs in O(log n) steps with high probability. To reduce the size of the messages that need to be exchanged, in at least one embodiment, ageing is employed. More specifically, each entry has a creation time stamp. The VFSs 106 will not propagate entries that are too old, that age being a tunable parameter established by a system operator.

The generation of a VFH does not require synchronization as long as the VFSs 106 exporting the same volume generate unique id values for all new objects. In at least one embodiment, this can be achieved by dividing the 64-bit address space for the ID values into large trunks, each with a few million entries, and allocating these trunks to different VFSs which then use the private addresses in the trunk exclusively to create new VFH values.

To remove an entry from the map, in at least one embodiment, the network file system 100 exploits the uniqueness of PFHs in the NFS protocol and uses a lazy garbage collection technique to prune obsolete entries in the map. Each VFS periodically verifies the entries in its allocation of the map and cache by sending a simple request to the PFSs 104 to determine if the PFH exists. If the PFH no longer exists in the PFS, the garbage collector initiates the deletion of the map entry using the uniform gossip protocol. This verification phase of the garbage collection can be performed in the background to reduce impact on client operations.

Virtualized Name Space

The virtualized name space is mapped to the individual name spaces of at least one PFS 104 by at least one VFS 106. More specifically, each virtual volume as presented by the VFSs 106 has its own name space which is constructed by virtualizing the name spaces of the underlying PFSs 104. For the clients 102, the virtualized name space provided by each VFS 106 is just like a single centralized PFS, even though the objects in the virtual volume transparently span across multiple PFSs 104. It is the use of junction directories that permits the subtrees of different PFSs 104 to appear as a single unified file system name space.

The name space operations for junction directories requires coordination as multiple PFSs 104 need to be consulted for the correct and transparent operation. For a junction directory, the originating VFS 106 records the association between an object name in the junction directory and it's actual parent directory in the file server. For example, in the junction directory / of Virtual Volume #3 in FIG. 2, / has two subdirectories, ETC and HOME each stored on different PFS, e.g. PFS 104B in the case of ETC and PFS 104A in the case of HOME.

The parent directories for ETC and HOME on their PFSs 104A, 104A are /ETC and /HOME, respectively, which are not visible to the clients 102. In at least one embodiment, the invisible directories used to implement a junction directory are stored as descendants of a special hidden directory, such as for example SUBTREE, established on each PFS.

To efficiently virtualize the name spaces, the VFSs interpose only on NFS operations that require coordination or special handling. A CREATE or MKDIR request, for example, requires that the new object created have a unique name in a directory; thus the VFS managing the junction directory checks for name conflicts by merging the object names in a junction directory from multiple PFS and forwarding the request to the PFS only if the check operation is successful. Similarly, READDIR or READDIRPLUS operations that list the contents of a directory, their attributes, and the file handles (for READDIRPLUS) can be completed only by the VFSs 106. Specifically, the VFS managing a junction directory sends the results of this operation in multiple messages, each message corresponding to a portion of the junction directory stored on a single PFS. Since the PFS may be using the same mechanism of sending the directory contents in multiple messages (for a large directory for example), the VFS needs to virtualize directory cookies and may need to reset special flags, e.g., the EOF flag marking the last reply message.

Directory cookies are known and understood as temporary identifiers valid only during the READDIR or READDIRPLUS operation. They are generated by the PFSs only. When a VFS receives a directory cookie as part of a directory read response, it rewrites the cookie with a virtual directory cookie and keeps the association between the two cookies. Since these are temporary identifiers, the VFS simply expires them once the operation is finished.

RENAME operations for the virtual volumes can be processed in one of at least four ways:

1—RENAME requests within the same directory are simply supported through the native RENAME since the VFSs 106 do not maintain the association between the names and objects.

2—RENAME request within a junction directory are handled by the VFS managing the junction directory. If the target name does not exist in the junction directory, or both the source and target are stored in the same PFS, simply forwarding the RENAME operation to that PFS is sufficient. If the source and target both exist on separate PFSs, first the target object which must be a file or an empty directory is deleted and then the RENAME request is forwarded to the file server storing the source object.

3—RENAME operations from within a subtree to another subtree stored on a different PFS is handled by creating a junction directory at the target PFS that contains only the object moved. This does not involve copying the file or directory contents between the PFSs, it merely moves the object in its source server to be underneath the special hidden directory (e.g., SUBTREE) used to store objects in junction directories.

4—RENAME request for a junction directory itself is similar to a usual directory rename, except it is handled at the VFS that manages the junction directory.

Lock Virtualization

For an embodiment wherein the PFSs 104 are NFS servers, NFS is known and understood to use Network Lock Manager (NLM) protocol to support file locking and Network Status Monitor (NSM) protocol to notify clients and servers about their lock state under the presence of server crashes and reboots. NLM follows the same simple one-server architecture as NFS and NLM servers are often co-located with NFS servers. By its own nature, these protocols are stateful—they maintain a record of which client currently owns a lock on a file and which other clients are waiting for a lock.

To avoid the complexities that might result in an attempt to virtualize the lock protocols, each VFS 106 implements the NLM and NSM protocols natively and keeps the temporary lock state entirely within the VFS. As each VFS appears to be a client to each PFS, the lock is maintained appropriately for the duration of the relevant transaction. It is noted that this state does not depend on the data stored in the PFSs 104. As each VFS 106 appears as a file server to each client 102, the VFS may employ a pseudo lock that mimics the NLM from the perspective of the client. This same methodology can be applied for other non-NFS embodiments of network file system 100.

Figure 4:
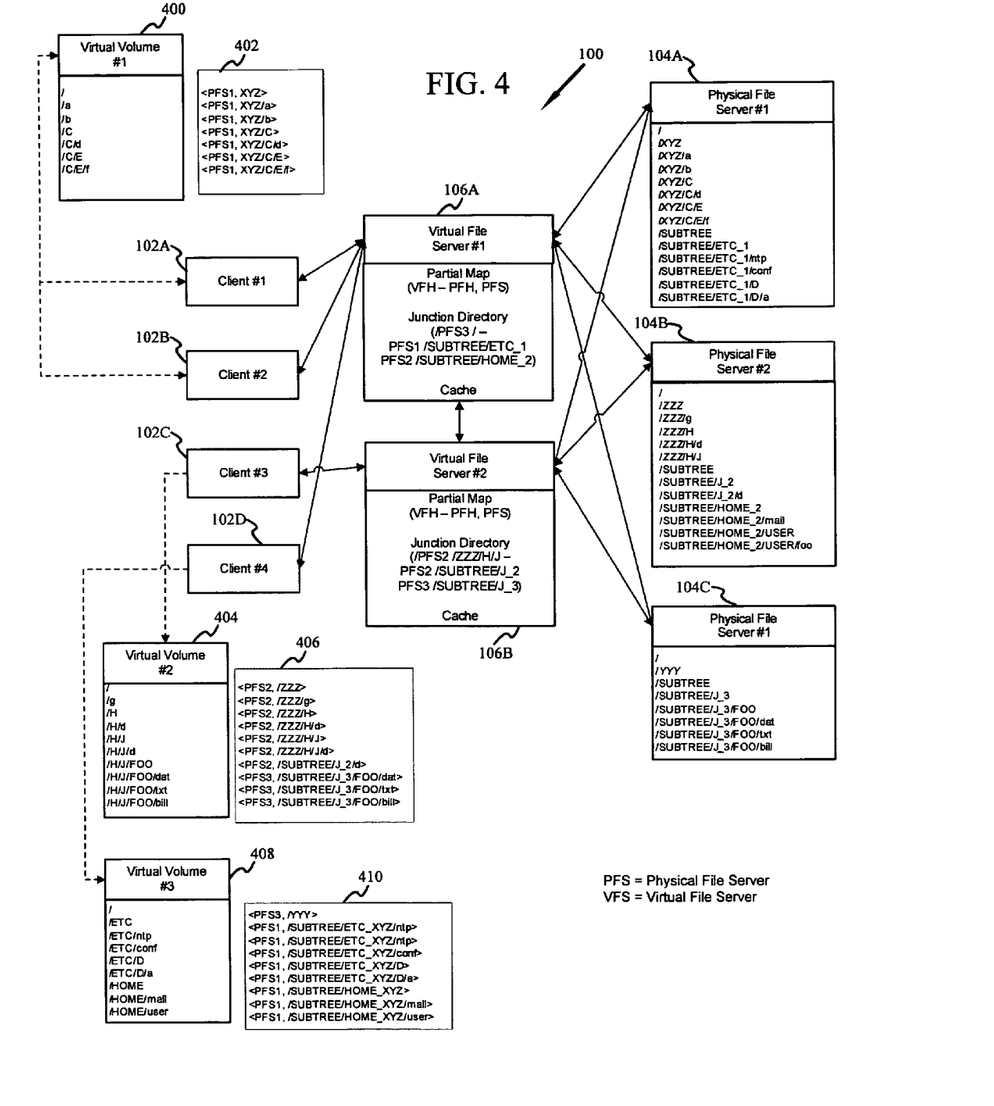
FIG. 4 is an enhanced version of the network file system shown in FIG. 1 in accordance with an embodiment.

FIG. 4 presents a more detailed view of the network file system 100 as shown in FIG. 1 and the virtual volumes depicted in FIG. 2. Specifically, example directories and files have been included so as to further demonstrate how the virtual volumes are established by the VFSs 106A, 106B and perceived by the clients 102A~102D. Again, as noted above, directories appear in ALL CAPS and files appear in lower case.

VFS 106A and 106B each have a part of the translation map for VFH to PFS:PFH pairings. In addition, each VFS also has information regarding the junction directories under respective control, and a cache serving to hold cookies, translations, or other information of a non-permanent nature.

As originally suggested in FIG. 2, Virtual Volume #1 maps to PFS#1, e.g. PFS 104A. As shown in FIG. 4, Virtual Volume 400 maps to "/XYZ" on PFS 104A. XYZ is an arbitrary name known only to VFSs 106A, 106B. The use of arbitrary directory names unique for each PFS 104 aids in avoiding name collisions. There are no junction directories present in Virtual Volume 400. For illustrative purposes, a map 402 is provided to permit comparison of the elements of Virtual Volume 400 to their true physical locations.

Virtual Volume 404 corresponding to Virtual Volume #2, maps to "/ZZZ" on PFS 104B. As with XYZ, ZZZ is an arbitrary name known only to the VFSs 106A, 106B. Virtual Volume 404 has two subdirectories H and J stored on PFS 104B and an additional subdirectory FOO stored on PFS 104C. Specifically directory J is a junction directory bringing together elements stored on PFS 104B, e.g., file d, and elements stored on PFS 104C, e.g., directory FOO and files dat, txt and bill. For illustrative purposes, a map 406 is provided to permit comparison of the elements of Virtual Volume 404 to their true physical locations.

As client 102C receives Virtual Volume 404 from VFS 106B, for the purpose of this example VFS 106B is considered the manager for the junction directory as well. Specifically, VFS 106B has a junction directory entry indicating that PFS 104B directory /ZZZ/H/J maps to PFS 104C directory /SUBTREE/J__2 and PFS 104C directory /SUBTREE/J__3. In at least one embodiment, each VFS 106 may utilize a dedicated application as a junction directory manager.

Virtual Volume 408 corresponding to Virtual Volume #3, maps to "/YYY" on PFS 104C. Again, as with XYZ and ZZZ, YYY is an arbitrary name known only to the VFSs 106A, 106B. In the case of Virtual Volume 408, the root directory is itself a junction directory containing two directories, specifically ETC from PFS 104A and HOME from PFS 104B. For illustrative purposes, a map 410 is provided to permit comparison of the elements of Virtual Volume 408 to their true physical locations.

As client 102D receives Virtual Volume 408 from VFS 106A, for the purpose of this example, VFS 106A is considered the manager for the junction directory as well. Specifically, VFS 106A has a junction directory entry indicating that the root directory of PFS 104C maps to PFS 104A directory /SUBTREE/ETC__1 and PFS 104B directory /SUBTREE/HOME__2.

As shown in Virtual Volumes 400, 404, 408 the provided subtree in each case appears as a seamless listing which, for all intents and purposes known to clients 102, is found on a single file server. With respect to each PFS 104A~104C, there is nothing strange or unusual imposed upon each system, rather the existing file and directory naming structures and conventions are used. This permits the robust file transaction protocols already in existence upon each PFS 104 (e.g., NFS version 3 protocols) to remain unchanged, and to handle file transactions upon each PFS 104.

The VFSs 106 are the key components responsible for the advantageous virtualizations utilized to provide the virtual volumes to the clients 102. Namely, the VFSs 106 provide the VFHs and are responsible for managing the junction directories.

With respect to the example network file system 100 of FIG. 4, FIGS. 5~7, example interactions between the clients 102 and the PFSs 104 via the VFSs 106 may be demonstrated as follows, using the commonly known "ls" command, understood and appreciated to list the files in a directory, and the commonly known "cat" command, understood and appreciated to concatenate the contents of a specified file. First, an interaction not involving a junction directory, e.g., an "ls" command for Virtual Volume #1. Second, an interaction involving a VFH, e.g. a "cat" command for Virtual Volume #1. Third, an interaction involving a junction directory, e.g., an "ls" command for Virtual Volume #2.

"ls" interaction for Virtual Volume #1

Figure 5:
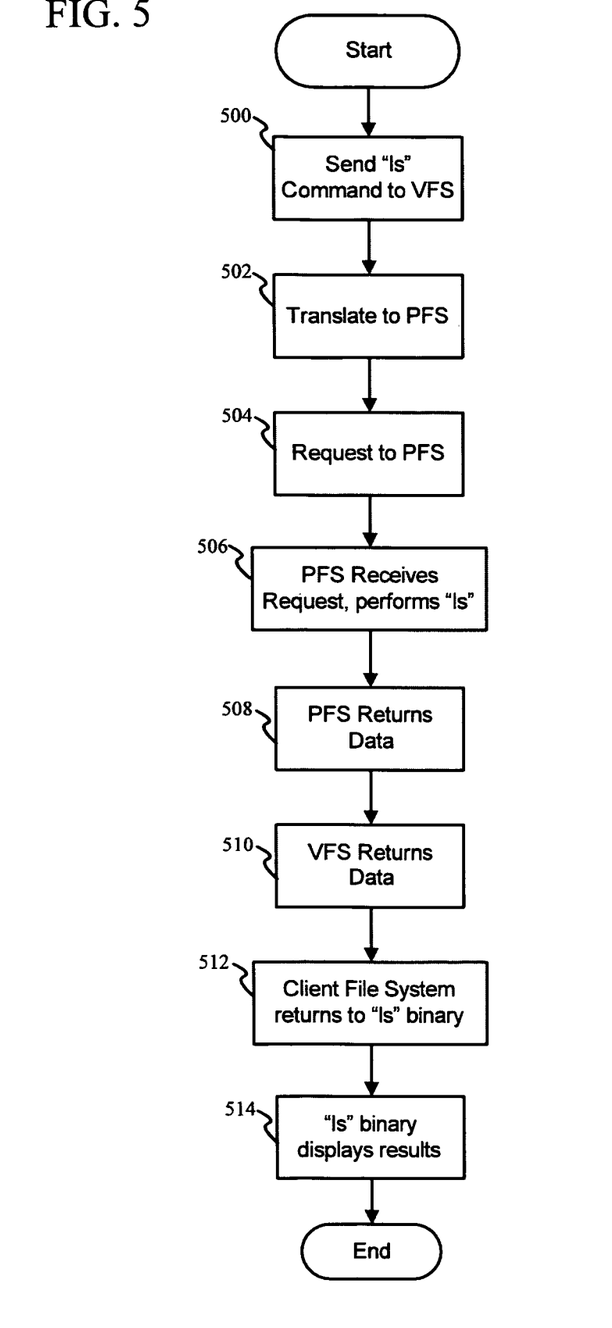
FIG. 5 is a flow diagram illustrating the interaction for a transaction not involving a junction directory in accordance with an embodiment.

With respect to FIGS. 4 and 5, client 102A has mounted Virtual Volume 400 via VFS 106A. From the perspective of client 102A, VFS 106A is a server, so the mounting process is the same as it would be in a traditional network file server environment. "ls" when invoked lists the files in the current working directory. It is understood and appreciated that options may be specified as well to list the files in a specific form. VFS 106A returns a VFH for the root of virtual volume 400 to client 102A. Client 102A now executes "ls" locally in the root directory, which in turn results in the client file system sending a READDIR (/) request to VFS 106A, block 500.

VFS 106A receives the READDIR (/) command and translates it to operate upon PFS 104A, directory /XYZ, e.g., READDIR (/XYZ). VFS 106A sends READDIR (/XYZ) to PFS 104A, blocks 502, 504. PFS 104A receives READDIR (/XYZ) and executes the command, block 506. PFS 104A returns [a, b, C/] to VFS 106A, block 508. VFS 106A receives this information and returns [a, b, C/] to client 102A, block 510. The file system of client 102A returns [a, b, C/] to the "ls" binary, and the "ls" binary displays the listing to the operator of client 102A, blocks 512, 514.

With knowledge of the files present in virtual volume 400, a continuing example is "cat /a" which is understood and appreciated to concatenate the contents of file "a".

"cat /a" Interaction for Virtual Volume #1

Figure 6:
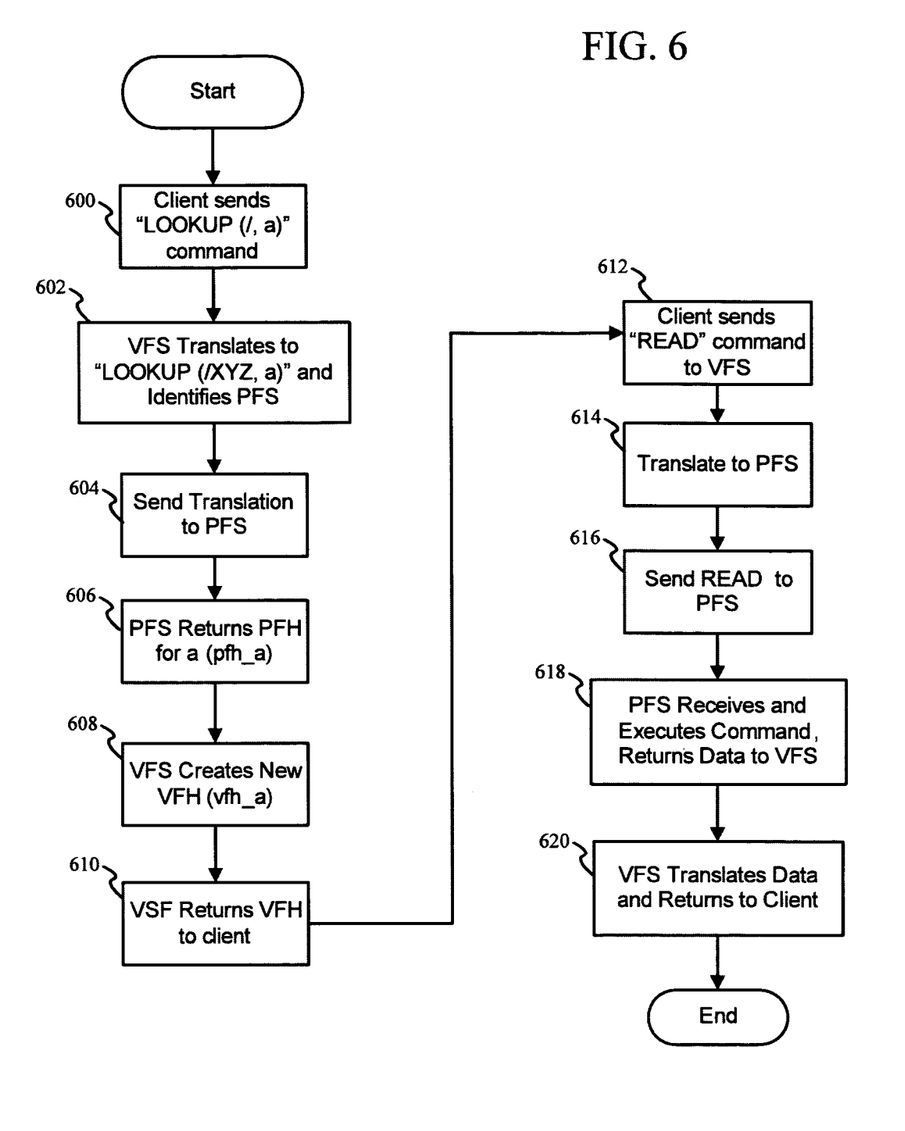
FIG. 6 is a flow diagram illustrating the interaction for a transaction involving the creation of a virtual file handle in accordance with an embodiment.

With respect to FIGS. 4 and 6, having received the listing of objects as set forth in the above "ls" example, client 102A now sends a LOOKUP (/, a) request to VFS 106A, block 600. VFS 106A translates/to identify directory /XYZ on PFS 104A, block 602. VFS 106A sends LOOKUP (/XYZ, a) to PFS 104A, block 604. PFS 104A returns the PFH for file "a" (e.g., pfh_a) to VFS 106A, block 606. For the sake of example, it is assumed that this is the first time that file "a" has been accessed. This establishes the translation of [/a PFS1:pfh_a], which is used by VFS 106A to generate a new VFH (e.g., vfh_a) for the map translation entry, block 608.

In at least one embodiment, VFS 106A hashes the PFS1: pfh_a pair to determine if another VFS, e.g., VFS 106B, is the responsible party for the map entry. For example, if the hash results in a "0", VFS 106A is the responsible party, and for a result of "1", VFS 106B is the responsible party.

If the hash determines that VFS 106A is the responsible party then VFS 106A will create and maintain the map translation. If the has determines that another VFS 106B is the responsible party, VFS 106A will ask VFS 106B for the map translation. If VFS 106B does not have the map translation, VFS 106B will create the map translation, maintain the map translation, and provide the map translation back to VFS 106A. In other words all VFS nodes can perform a hash, but only the identified responsible party nodes (e.g., the backward manager) may create a map translation.

In yet another alternative embodiment, if VFS 106B is the responsible backward manager as identified by the hash, but does not have the map translation, VFS 106A will create the map translation and provide it to VFS 106B. VFS 106A may maintain a copy of the map translation as a temporary record. This second method of allocating map entries may result in an imbalance loading of the map entries between the VFS 106, but still may be desirable in certain system configurations.

VFS 106A now returns vfh_a for file "a" to client 102A, block 610. "cat" when invoked concatenates the contents of a specified file to standard output such as, for example the display. Client 102A now sends a READ (vfh_a, 0, size) command to VFS 106A, block 612. VFS 106A consults its allocation of the map and translates vfh_a to PFS1:phf_a and sends a READ (phf_a, 0, size) command to PFS 104A, blocks 614, 616. PFS 104A receives the command, executes the command and returns the requested data to VFS 106A, block 618. VFS 106A receives the data and returns the data to client 102A, block 620.

Figure 7:
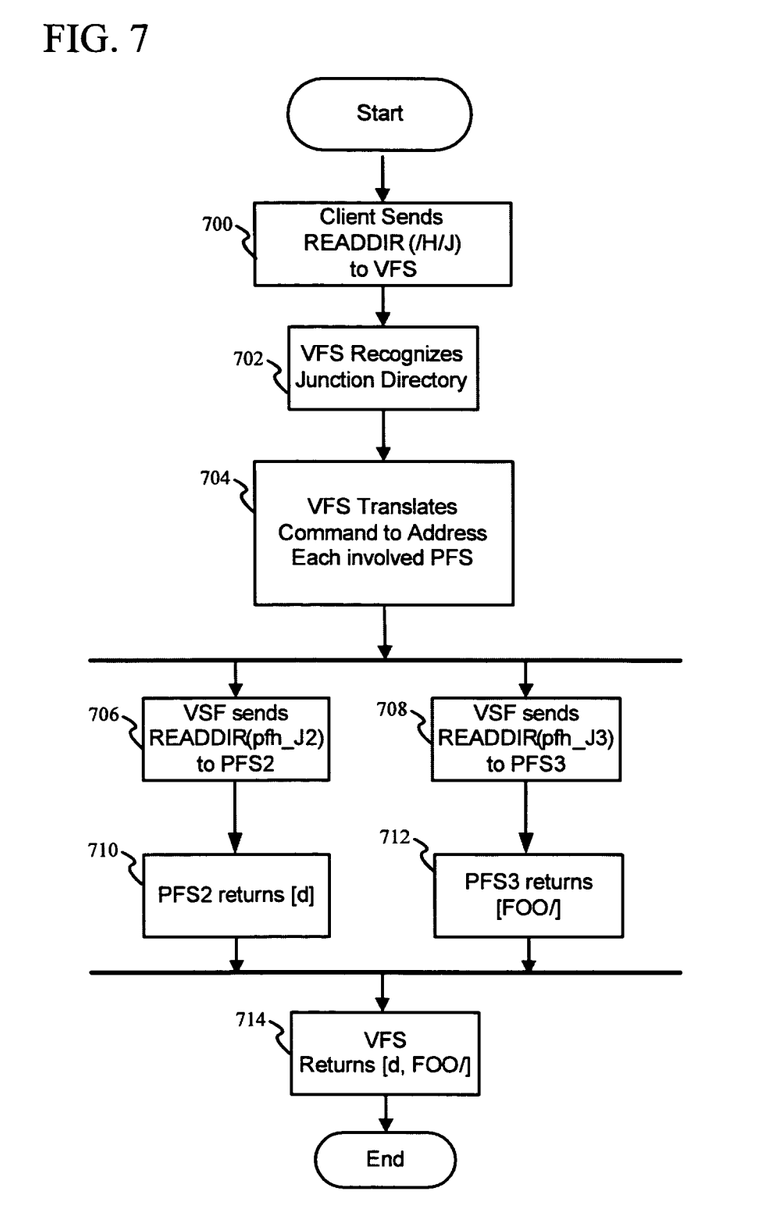
FIG. 7 is a flow diagram illustrating the interaction for a transaction involving a junction directory in accordance with an embodiment.

Having now described interactions not involving a junction directory, it is reasonable to present an example that does involve a junction directory e.g., an "ls" command for Virtual Volume #2, subdirectory /H/J.

"ls" Interaction for Virtual Volume #2

In this example, client 102C interacts with VFS 106B as above to perform an "ls" operation for /H. As directory H is not a junction directory, the process proceeds as described above returning [g, J/]. Client 102C now desires to perform an "ls" operation for /H/J, directory J being a junction directory.

With respect to FIGS. 4 and 7, from the clients perspective the interaction is exactly the same, specifically client 102C sends a READDIR (/H/J) to VFS 106B, block 700. The VFH corresponding to directory J is recognized by VFS 106B as being a junction directory with two mappings, block 702. Specifically, the junction directory record held by VFS 106B indicates that some data is stored on PFS 104B (PFS2:pfh_J2 representing PFS2:/SUBTREE/J_2). The record also indicates that some data is stored on PFS 104C (PFS3:pfh_J3 representing PFS3:/subtree/J3), block 704.

VFS 106B therefore dispatches two commands, READDIR (pfh_J2) to PFS 104B and READDIR (pfh_J3) to PFS 104C, blocks 706, 708. In response to these commands, PFS 104B returns [d] to VFS 106B and PFS 104C returns [FOO/] to VFS 106B, blocks 710, 712. VFS 106B in turn reformats these two independent responses to appear as a single response and returns [d, FOO/] to client 102C, block 714. The file system of client 102C returns [d, FOO/] to the "ls" binary, and the "ls" binary displays the listing to the operator of client 102C.

As the above examples illustrate, the VFSs 106 serve as a distributed gateway to the actual PFSs 104. As there can be more than one VFS 106 in network file system 100, it is possible to scale the number of VFSs 106 in order to meet client demands and avoid bottleneck constraints. Further, as the file processing tasks remain with the PFSs 104 in their native environment and with native protocols, network file system 100 maintains the optimizations for file interaction as provided by the PFSs 104.

In addition to the advantages provided by the virtualization of the ID space and name space in network file system 100 described above, the VFSs 106 permit transparent migration of objects, e.g., files and directories, between the PFSs 104. In addition such migration is achieved without limiting client 102 access to the involved objects. This dynamic, transparent migration provides numerous advantages for network file system 100, such as for example, but not limited to, load balancing between PFSs 104, full capability for the clients to move objects in the virtual volumes without concern as to the actual physical locations, and improved network file system 100 maintenance.

Figure 8:
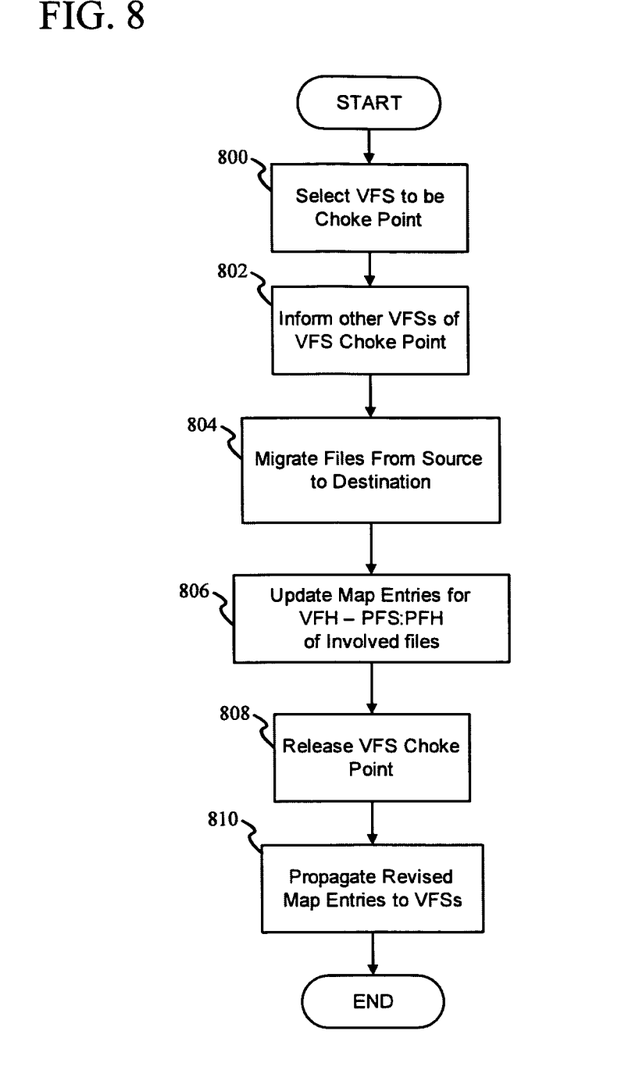
FIG. 8 is a flow diagram illustrating the operation of file migration in accordance with an embodiment.
Figure 9:
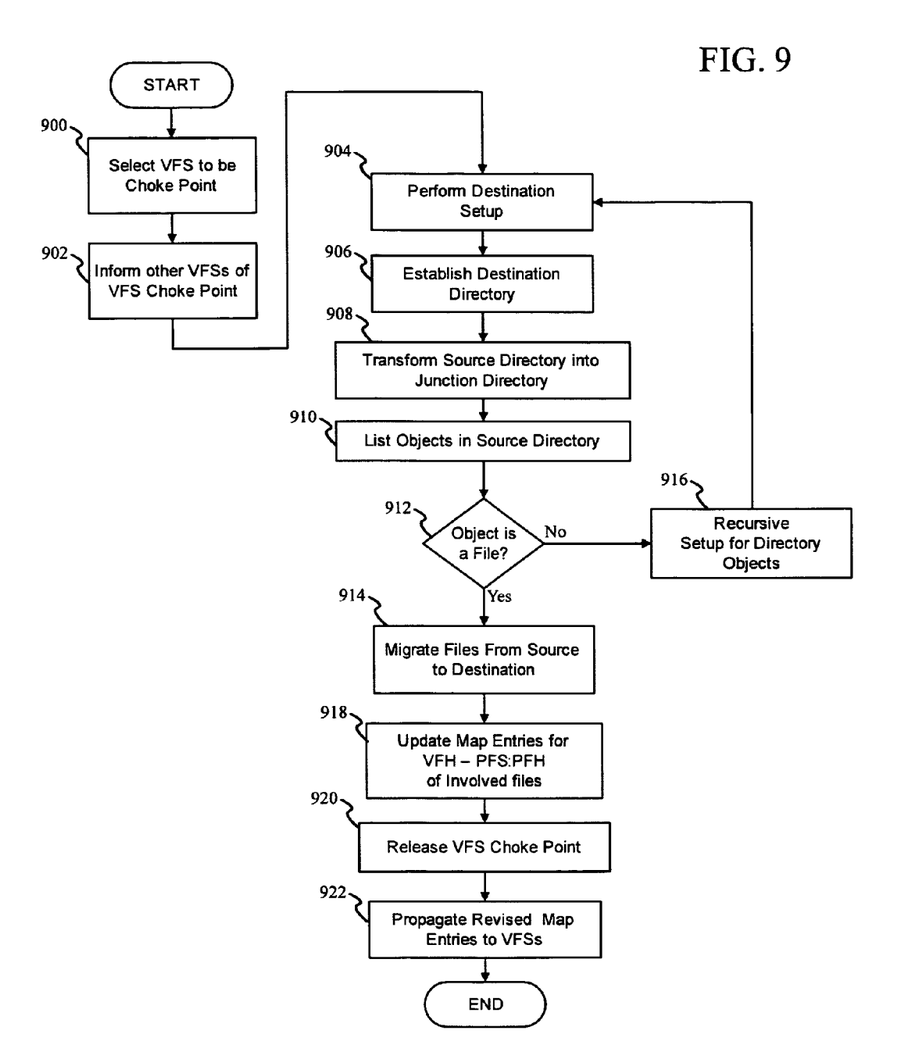
FIG. 9 is a flow diagram illustrating the operation of directory migration in accordance with an embodiment.

FIGS. 8 and 9 provide flow diagrams illustrating how object migration is achieved in at least one embodiment. It will be appreciated that the described method need not be performed in the order in which it is herein described, but that this description is merely exemplary of one method of performing group communication in accordance with at least one embodiment.

File Migration

Specifically, with respect to FIG. 8, when a VFS 106 receives a transaction from a client 102 to initiate a file migration, a VFS 106 is selected to act as a choke point for all access transactions involving the files to be moved, block 800.

In at least one embodiment, this selected VFS 106 is the VFS 106 receiving the request from the client 102. In at least one alternative embodiment, the selected VFS 106 is determined by hashing either the VFH or PFS:PFH pair identifying the file(s) to be moved to identify a specific VFS 106. In yet another embodiment, the selected VFS 106 may be the VFS 106 with the most available resources.

So as to properly function as the choke point, all other VFSs 106 in the network file system 100 are informed of the selected choke point VFS, block 802. As a result all the remaining VFSs 106 will forward any requests to VFHs translating to involved files to the choke point VFS.

Each involved file from an indicated source directory PFS is then migrated to a destination directory, block 804. In at least one embodiment, it is of course understood and appreciated that prior to commencing the file migration, the initiating client 102 may well have requested the creation of a new directory upon the PFS 104. In at least one embodiment, following the migration, the choke point VFS updates the map of PFS:PFH and associated VFH entries to reflect the destination directory, block 806.

As the PFS 104 perceives the choke point VFS as a client, the protocols used to direct the migration of files between directories upon the same PFS 104 are the native protocols known and utilized by the PFS 104. Moreover, no special commands or protocols are required, rather from the perspective of the PFS 104, it is simply executing a normal migration request.

When the migration is complete, the choke point VFS releases its choke point control and informs all other VFSs 106 of the release, block 808. In addition, the updated VFHs and map entries are propagated to the other VFSs 106, block 810. Cleanup operations are performed by the PFS 104 in the same manner as would occur for any other native file migration operation, such as the PFS removing the PFHs from record.

During the migration operation, it is of course realized that one or more other clients 102 may desire access to an involved file. In the event of such a desired interaction, the request is forwarded to the choke point VFS, if not received by it directly. For each READ transaction received by the choke point VFS, the choke point VFS will translate the request and forward it for execution upon the source directory, thus returning data from the source directory. By using the source directory, it is insured that the READ transaction will return complete data.

For each WRITE transaction received by the choke point VFS, the choke point VFS will translate the request and forward it for execution upon both the source directory and the destination directory. Such duality of action is preferred as it insures current data in both the source and destination directories without having to synchronize the WRITE operations.

Directory Migration

FIG. 9 illustrates an example of directory migration. Specifically, when a VFS 106 receives a transaction from a client 102 to initiate a directory migration, a VFS 106 is selected to act as a choke point for all access transactions involving the directory and it's associated objects to be moved, block 900.

As in the example of FIG. 8, in at least one embodiment, this selected VFS 106 is the VFS 106 receiving the request from the client 102. In at least one alternative embodiment, the selected VFS 106 is determined by hashing either the VFH or PFS:PFH pair identifying the directory to be migrated, to identify a specific VFS 106. In yet another embodiment, the selected VFS 106 may be the VFS 106 with the most available resources.

So as to properly function as the choke point, all other VFSs 106 in the network file system 100 are informed of the selected VFS choke point, block 902. As a result all the remaining VFSs 106 will forward any requests to VFHs translating to involved files to the VFS choke point.

The choke point VFS 106 now performs destination setup, as indicated by block 904. Specifically, this involves establishing a destination directory on a destination PFS corresponding to a specified source directory, block 906. The source directory is then transformed into a junction directory consisting of all existing objects within the source directory and the destination directory, block 908. A list of all objects within the source directory is then obtained, block 910.

If an object is a file, decision 912, the file object is migrated from the source directory to the destination directory, block 914. If an object is a sub-directory, decision 912, the method enters a recursive state, block 916, and returns to the destination setup for the sub-directory object, block 904.

As the objects are being moved from one PFS to another PFS (e.g., PFS 104A to PFS 104C), localized migration protocols upon a single PFS 104 are not truly applicable. However, once again it is noted that from the perspective of each PFS, 104 the choke point VFS 106 is a client 102. Migration of the directory and all of its associated objects is therefore accomplished by simply applying repetitive and/or recursive READ and WRITE commands, i.e., reading the object from the source PFS, e.g., PFS 104A and writing the object to the destination PFS, e.g., PFS 104C. Again, no non-native protocols are required by either the source or destination PFS in order to accomplish the directory migration.

It is also to be appreciated that the basic methodology for directory migration can be employed in at least one embodiment so as to permit file migration between different PFSs 104. In such an instance the creation of the destination directory may or may not be desired.

In at least one embodiment, following the migration, the choke point VFS 106 updates the map of PFS:PFH and associated VFH entries to reflect the destination directory and all associated objects therein, block 918.

When the migration is complete, the choke point VFS 106 releases its choke point control and informs all other VFSs 106 of the release, block 920. Depending on the new subtree configuration resulting from the directory and/or file migration, the source directory's status as a junction directory may or may not be maintained. In at least one embodiment, the parent directory of the source directory will be transformed into a junction directory so as to properly maintain continuity to the new location of the destination directory. Of course, if the destination directory is appended to a different subtree, neither the source, nor the source parent directory need be a junction directory.

In addition, the updated VFHs and map entries are propagated to the other VFSs, block 922. Cleanup operations are performed by the PFS 104 in the same manner as would occur for any other native file migration operation, such as the PFS 104 removing the PFHs from record maintained by the PFS 104 having the source directory.

As described in the example presented in FIG. 8 for file migration, during the directory migration operation, it is of course realized that one or more other client systems 102 may desire access to an involved file. In the event of such a desired interaction, the request is forwarded to the choke point VFS, if not received by it directly. For each READ transaction received by the VFS choke point, the VFS choke point will translate the request and forward it for execution upon the source directory, thus returning data from the source directory. By using the source directory, it is insured that the READ transaction will return complete data.

For each WRITE transaction received by the VFS choke point, the VFS choke point will translate the request and forward it for execution upon both the source directory and the destination directory. Such duality of action is preferred as it insures current data in both the source and destination directories without having to synchronize the WRITE operations.

With respect to the above description and accompanying figures, it is understood and appreciated that network file system 100 is established without modifying clients 102 or PFSs 104, or imposing additional hardware, software, libraries, or other elements upon either the clients 102 or the PFSs 104. Specifically, network file system 100 enjoys scalability, the native file transaction protocols of the PFSs 104, and full virtualization of the ID space and name space by employing one or more VFSs 106 in the network data path between the clients 102 and PFSs 104. In addition, this virtualization is transparent to both the clients 102 and the PFSs 104. Moreover, the virtualization, and specifically the junction directories, are achieved using the existing file system structures and protocols native upon the PFSs 104, e.g., the example /SUBTREE directories shown and described with respect to FIG. 4. More specifically, that the directory names known only to the VFSs 106 is immaterial to the PFSs 104.

In at least one embodiment the network file system 100 is established by providing a computer readable medium wherein the above method is stored as a computer program, which when executed by a computer, such as an intended VFS 106, will perform the method of transparent protocol virtualization. The form of the medium and the language of the program are understood to be appropriate for the system(s) intended to act as VFS 106.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of protocol virtualization for a network file system, comprising:
   establishing virtual file servers (VFSs) in a data path between at least one client and at least one physical file server (PFS);
   presenting a virtualized name space to the at least one client, the virtualized name space mapped to individual name spaces of at least one PFS by the VFSs;
   virtualizing an ID space in response to a request from a client, within the ID space each file identified by a physical file handle (PFH) on each PFS, the PFH and PFS pair mapped to provide a virtual file handle (VFH) and the map of the VFHs being allocated among the VFSs;
   providing the VFHs to the at least one client by the VFSs, the at least one client perceiving the VFSs as file servers;
   wherein with each file request from a first client, a first VFS receives a first VFH, the first VFS translating the first VFH to the associated PFH and PFS, the first VFS re-formatting the file request and directing the re-formatted file request and PFH to the PFS, the first VFS receiving at least one response from the PFS, and the first VFS reformatting the response and transmitting the re-formatted response to the first client;
   selecting a VFS to act as a choke point for all access transactions involving the files to be moved;
   informing all other VFSs of the selected VFS choke point, all other VFSs directing requests to VFHs translating to involved files to the choke point;
   copying each involved file from a source directory PFS to a destination directory PFS;
   updating the map of PFH, PFS and associated VFH entries to reflect the destination directory; and
   releasing the VFS choke point and informing all other VFSs of the release; and
   propagating the updated VFHs to the other VFSs;
   wherein for each read request transaction received by the VFS choke point, accessing and returning data from the source directory;
   wherein for each write request transaction received by the VFS choke point, the VFS choke point delivering the write transaction to both the source directory and the destination directory.

2. The protocol virtualization method of claim 1, wherein the VFSs are transparent to the at least one client and the at least one PFS.

3. The protocol virtualization method of claim 1, wherein:
   in response to a plurality of PFSs, establishing at least one junction directory upon at least one of the VFSs, the junction directory identifying files mapped between at least two PFS;
   wherein for a directory request involving the junction directory, said at least one of the VFSs receives the request, identifies at least two PFSs, re-formatting the request for each identified PFS, receives at least one response from each identified PFS, and returns a combined response.

4. The protocol virtualization method of claim 1, wherein each PFS is an NFS server, each VFS perceived as an NFS server by each client, each VFS perceived as a client by each PFS.

5. The protocol virtualization method of claim 1, wherein the mapping of each PFH and PFS pair to a VFH is unique and arbitrary.

6. The protocol virtualization method of claim 1, wherein for the translation of the first VFH, the first VFS consults its allocation of the map;
   in response to the translation occurring in the allocation, the first VFH performing the translation directly, and
   in response to the translation being unavailable in the allocation performing a hash upon the VFH to identify a second VFS having the appropriate allocation and requesting the translation from the second VFS.

7. The protocol virtualization method of claim 6, wherein requested translations are locally cached by the first VFH for a tunable period of time.

8. The protocol virtualization method of claim 1, wherein the method is stored on a computer readable medium as a computer program which, when executed by a computer will perform the steps of protocol virtualization.

9. A method of protocol virtualization for a network file system, comprising:
    establishing virtual file servers (VFSs) in a data path between at least one client and at least one physical file server (PFS);
    presenting a virtualized name space to the at least one client, the virtualized name space mapped to individual name spaces of at least one PFS by the VFSs;
    virtualizing an ID space in response to a request from a client, within the ID space each file identified by a physical file handle (PFH) on each PFS, the PFH and PFS pair mapped to provide a virtual file handle (VFH) and the map of the VFHs being allocated among the VFSs;
    providing the VFHs to the at least one client by the VFSs, the at least one client perceiving the VFSs as file servers;
    wherein with each file request from a first client, a first VFS receives a first VFH, the first VFS translating the first VFH to the associated PFH and PFS, the first VFS re-formatting the file request and directing the re-formatted file request and PFH to the PFS, the first VFS receiving at least one response from the PFS, and the first VFS reformatting the response and transmitting the re-formatted response to the first client;
    selecting a VFS to act as a choke point for all access transactions involving a source directory on a source PFS to be moved;
    informing all other VFSs of the selected VFS choke point, all other VFSs directing requests to VFHs translating to involved files under the source directory to the choke point;
    performing destination setup, including:
        establishing a destination directory on a destination PFS corresponding to the source directory;
        transforming the source directory into a junction directory consisting of all existing objects within the source directory and the destination directory;
        retrieving a list of all objects within the source directory;
        copying each file object from the source directory to the destination directory;
    in response to a sub-directory object, recursively performing the destination setup for each sub-directory object;
    updating the map of PFH, PFS and associated VFH entries to reflect the at least one destination directory; and
    releasing the VFS choke point and informing all other VFSs of the release; and
    propagating the updated VFHs to the other VFSs;
    wherein for each read request transaction received by the VFS choke point, accessing and returning data from the source directory;
    wherein for each write request transaction received by the VFS choke point, the
    VFS choke point delivering the write transaction to both the source directory and the destination directory.

10. A network file system, comprising: at least one unmodified client; at least one unmodified physical file server (PFS), each PFS having at least one file identified by an associated physical file handle (PFH); virtual file servers (VFSs) in a data path between the at least one client and at least one PFS; a virtualized name space mapped to the at least one PFS, the name space provided to the at least one client by the VFSs; a virtualized ID space established in response to a request from a client, within the ID space each file identified by a physical file handle (PFH) on a PFS, the PFH and PFS pair mapped to provide a virtual file handle (VFH) and the map of VFHs being allocated among the VFSs.

11. The network file system of claim 10, wherein with each file request from a first client, a first VFS is operable to receive a first VFH, the first VFS translating the first VFH to the associated PFH and PFS, the first VFS re-formatting the file request and directing the re-formatted file request and the PFH to the PFS, the first VFS receiving at least one response from the PFS, the VFS re-formatting the response and transmitting the re-formatted response to the first client.

12. The network file system of claim 10, further including a junction directory upon at least one of the VFSs, the junction directory identifying files mapped between at least two PFSs.

13. The network file system of claim 12, wherein for a directory request involving the junction directory, a first VFS is operable to receive the request, identifies the at least two PFSs, re-formatting the request for each identified PFS, receives at least one response from each identified PFS, and returns a combined response.

14. The network file system claim 10, wherein the mapping of each PFH and PFS pair to a VFH is unique and arbitrary.

15. The network file system claim 10, wherein for the translation of the first VFH the first VFS is operable to consult its allocation of the map; in response to the translation occurring in the allocation, the first VFH performing the translation directly; in response to the translation being unavailable in the allocation performing a hash upon the VFH to identify a second VFS having the appropriate allocation and requesting the translation from the second VFS.

16. the network file system of claim 15, wherein each VFH is operable to cache requested translations for a tunable period of time.

* * * * *